May 14, 1929.    C. R. SHORT ET AL    1,712,938
CHANGE SPEED MECHANISM
Filed April 16, 1926    3 Sheets-Sheet 1

Inventors
Charles R. Short
Victor Hughes
By Blackmore, Spencer & Flint
Attorneys May 14, 1929.  C. R. SHORT ET AL  1,712,938
CHANGE SPEED MECHANISM
Filed April 16, 1926  3 Sheets-Sheet 2

Inventors
Charles R. Short
Victor Hughes

By Blackmore, Spencer & Flint
Attorneys

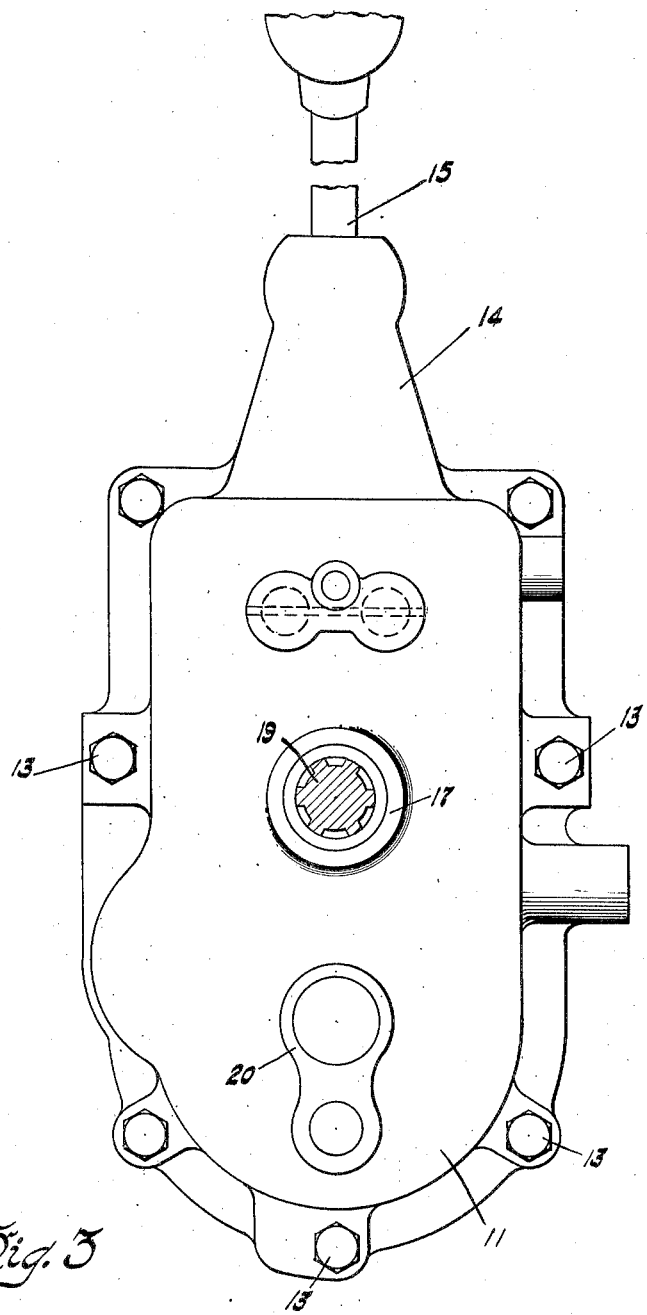

Patented May 14, 1929.

1,712,938

UNITED STATES PATENT OFFICE.

CHARLES R. SHORT, OF DAYTON, OHIO, AND VICTOR HUGHES, OF DETROIT, MICHIGAN, ASSIGNORS TO GENERAL MOTORS RESEARCH CORPORATION, OF DETROIT, MICHIGAN, A CORPORATION OF DELAWARE.

CHANGE-SPEED MECHANISM.

Application filed April 16, 1926. Serial No. 102,523.

This invention relates to the change speed gear box of a motor vehicle and mechanism for shifting the gears therein in order to selectively engage the proper gears to give a desired speed ratio between the engine and traction wheels.

Its object is to simplify the construction and assemblage of parts.

The invention consists in standard gear equipment of sliding change gear type inclosed in a gear casing adapted to permit quick and easy assembling of the gears and in improved selective mechanism composed mainly of metal stampings of simple form.

In the accompanying drawings, in which like reference characters indicate like parts throughout the several views:

Fig. 3 is a rear elevation;

Fig. 4 is a perspective view of a pair of sliding gear shifting forks, guide rods and notched safety plate detached;

Fig. 5 is a perspective view of the sliding shifting fork for selecting the high speed and intermediate combination of gears.

Figure 1:
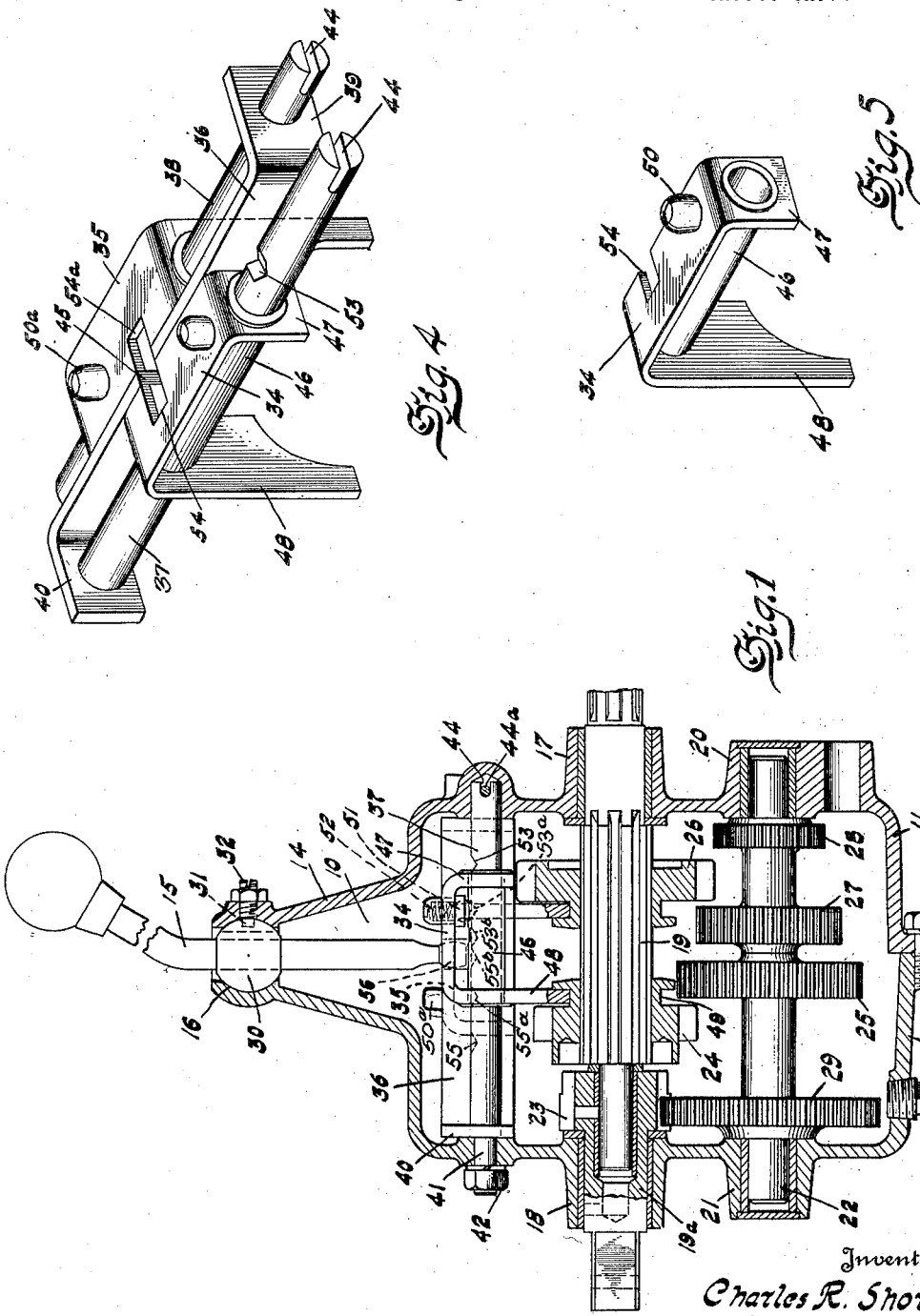
Fig. 1 is a vertical longitudinal section on more than one plane through a gear casing constructed in accordance with this invention.
Figure 2:
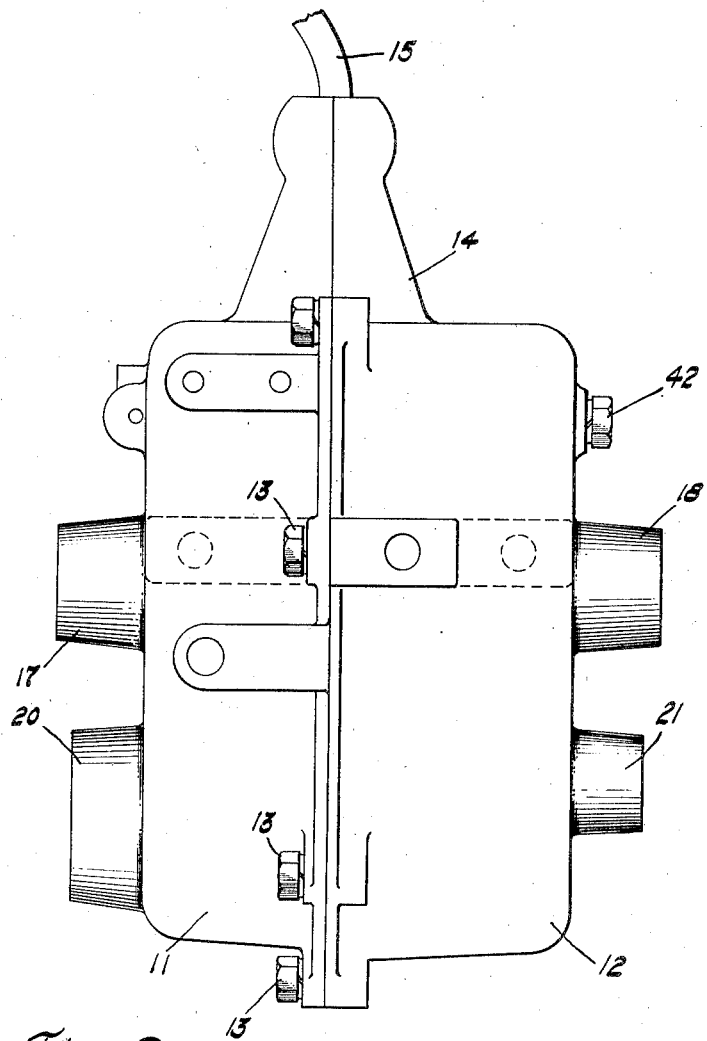
Fig. 2 is a side elevation of the gear casing.

In the drawings, 10 indicates a casing for the change speed gearing. The casing 10 is composed of two sections 11 and 12 having faces meeting in a plane transverse of the axes of the incased gears. There are suitable flanges and thickened bosses about the outside margins of the sections which are drilled and threaded to receive bolts 13 for removably securing the sections together.
Rising from the upper side of the casing 10, as indicated in Figs. 1, 2 and 3, is a hollow conoidal member 14 in the apex of which the gear shifting lever 15 is universally fulcrumed. The member 14 may be and preferably is formed in two halves, one being integral with section 11 and the other with section 12. A spherical seat 16 is formed within the apex of member 14, one half in each of the divided parts, for a purpose to be later explained.

Hollow, lined bearing lugs 17 and 18 for receiving the usual spline shaft 19 and coupling shaft 19ª are formed in sections 11 and 12 respectively. Other hollow and lined bearing lugs 20 and 21 are formed for reception of the usual countershaft 22. Suitable provision is also made for reception of the usual idler forming part of the reverse train (not shown). Gear 23, on coupling section 19ª, sliding gear 24, with clutch face for interlocking with gear 23 for direct high speed drive and intermeshing with gear 25 for intermediate speed, sliding gear 26 for intermeshing with gear 27 for low, and with idler meshing with gear 28 for reverse, and countershaft driving gear 29 in constant mesh with gear 23, are the usual gears in present use in the sliding gear type of change speed gearing for motor vehicles.

The selective mechanism, or means for selecting and shifting gears 24 and 26 to effect a change of gear ratios, and the general organization permitting convenient assemblage are believed to be new.

Said selective mechanism comprises the manual gear shifting lever 15, the shifter forks 34 and 35, notched safety plate 36, guide rods 37 and 38, their specific construction and relationship to each other, the manual lever and the gear casing.

The gear shift lever 15 is of standard shape and location. It extends through a hole in and is pinned to the spherical fulcrum member 30 which bears in the seat 16 formed in the apex of the conoidal casing member 14. The spherical member may rock in all directions necessary to afford the required movement of the lower end of the lever 15 but is prevented from rotating in a horizontal plane by a stud 31 on the end of an adjustable screw 32, said stud engaging a groove in the spherical body.

Shifter forks 34 and 35, separated by safety plate 36, are slidably mounted on guide rods 37 and 38 respectively. The ends of plate 36 are bent in opposite directions at substantially right angles to the main body of the plate, forming end flanges 39 and 40 bearing against the inner sides of sections 11 and 12, respectively, of the housing. Each end flange is perforated. Guide rods 37 and 38 have reduced and shouldered ends 41 which pass through holes in the wall of housing section 12. The reduced end 41 of rod 37 also passes through the flange 40 of plate 36. A nut 42 threaded on the reduced end 41 which protrudes through the wall of housing section 12 draws the shoulder on the guide rod 37 formed by the reduced end against the inner face of flange 40 and thus secures the plate 36 and guide rod 37 rigidly in place. By this construction the guide rods are accurately positioned so as to maintain the detent notches hereinafter referred to in correct relation. The other ends of said rods 37 and 38 are seated in sockets in the wall of section 11 of the housing, guide rod 38 passing through the hole in flange 39 of plate 36. The ends of guide rods 37 and 38 are transversely slotted as at 44 to engage a pin 44$^a$ by which said guide rods are prevented from rotating.

Safety plate 36 has in it a central notch 45, to permit the lower end of lever 15 to pass from one side to the other of the plate when the gears are in neutral position.

Shifter forks 34 and 35 are stamped from sheet metal. Guide tube 46 bridges the space between the downturned flange 47 and the fork arm 48 of fork 34, the extremity of which is engaged in the groove 49 of gear 24. Tube 46 may be secured to the shifter fork 34 by expanding its ends or otherwise. A detent housing 50 is formed in or secured to the upper surface of shifter fork 34. Its lower open end registers with a hole in guide tube 46. A detent 51 urged downward by spring 52 within the detent housing 50, is adapted to engage either of three notches 53, 53$^a$, or 53$^b$ in the upper surface of guide rod 37, to latch the fork 34 when it has moved to position in which the gears are in intermediate, neutral or high, respectively. Fork 34 has a notch 54 facing the plate 36 which is of the same width as notch 45 in said plate and registers with said notch when gear 24 is in neutral position.

Shifter fork 35 is the same in form as shifter fork 34, except that it is reversed in position so that when notch 54$^a$ registers with notch 45 in plate 36 the gear controlled by it is in neutral. Rod 38 is provided with notches 55, 55$^a$, 55$^b$, with which the detent that is within detent casing 50$^a$ may engage. When the detent in casing 50$^a$ engages notch 55$^a$ in rod 38, gear 26, which is controlled by shifter fork 35 is in neutral; when it engages notch 55$^b$, the gear 26 is meshed with gear 27, the low speed combination being then effective; when the detent is engaged in notch 55, gears 26 and the reverse idler are in mesh and the reverse combination is effective.

The lower end of lever 15 is provided with a terminal bearing 56 having curved bearing surfaces to engage in the notches 54 or 54$^a$ as required to shift either of the shifter forks 34 or 35. Lever 15 may be rocked sidewise when notches 45, 54 and 54$^a$ are in registration, and may be rocked in a fore and aft direction, on one side or the other of plate 36 to slide the gears 24 or 26 selectively to their several combining positions. The movements of lever 15 for selecting the desired combinations of gears are those of standard automobile practice.

From the foregoing description it will be perceived that the parallel gear shafts with gears on them, the shifter guide rods, with assembled shifter forks and safety plate, may be assembled in the section 12 of the gear housing section 11 of the housing may then be brought face to face with section 12, the several shafts and rods entering the respective sockets and bearing holes provided for them in said section 11. Pin 44$^a$ may be seated when the sections are brought together as the slots 44 in rods 37 and 38 are open ended. The pin may, however, be driven in afterwards.

Although we have described one specific embodiment of our invention which is the best now known to us, it is not intended that we shall be limited to the particular embodiment described and shown, but only by the definitions of the appended claims.

What we claim is:

1. In a change speed mechanism for motor vehicles, a gear casing, comprising two sections, parallel gear carrying shafts and guides, gear shifting elements movable on the guides, and a gear shift lever having a fulcrum seat in the casing, said casing having meeting faces transverse of the shafts and guides intersecting the fulcrum seat of the shifting lever, and suitable alined bearings and supports for the shafts and guides.

2. The combination as defined in claim 1, in which the guides have reduced and shouldered ends secured in one section of the casing, the other section having sockets for receiving the other ends of said guides.

3. The combination as defined in claim 1, in which the guides have suitably spaced detent notches and reduced and shouldered ends secured in one section of the casing, the other ends of the guides being seated in sockets in the other section of the casing, and means for preventing the guides from rotating.

4. In a change speed mechanism for motor vehicles, a gear casing comprising two sections, parallel gear carrying shafts and guides within said casing, said casing sections having meeting faces transverse of the shafts and guides; said guides consisting of parallel rods; having reduced and shouldered ends secured in one section, and socketed into the other; a notched safety plate between said guide rods, said safety plate having at one end a flange penetrated by the reduced and shouldered end of one guide rod; and its other end a flange penetrated by the other guide rod, two shifter forks, one slidable on each guide, said forks having opposed notches adapted to register with the notch in the safety plate, and a shifter lever adapted to be selectively engaged with the notches in the shifter forks.

5. In a change speed mechanism, a mechanism for selectively shifting gears comprising guide rods, pressed sheet metal shifter forks slidable on said guide rods, said forks having notches for engagement by the shifter lever; a notched safety plate separating said guide rods and shifter forks, said safety plate, consisting of the sheet metal, having its opposite ends bent oppositely to form flanges, one guide rod penetrating one flange and the other guide rod penetrating the other flange.

6. In a change speed mechanism for motor vehicles, a gear casing comprising two separable sections, parallel gear carrying shafts and guides, gear shifting elements movable on said guides, a gear shifting lever, a spherical fulcrum member on the lever, and a spherical fulcrum seat in the casing, said casing section having meeting faces transverse of the shaft and guides and each section containing one-half of the spherical fulcrum seat of the shifting lever.

In testimony whereof we affix our signatures.

CHARLES R. SHORT.
VICTOR HUGHES.